(12) United States Patent
Yasumitsu

(10) Patent No.: US 9,725,847 B2
(45) Date of Patent: Aug. 8, 2017

(54) CLOTH CONTAINING AN ORGANIC FIBER AND HAVING A FLUORINE COMPOUND ATTACHED TO THE CLOTH, AND TEXTILE PRODUCT COMPRISING THE CLOTH

(75) Inventor: Ryo Yasumitsu, Osaka (JP)

(73) Assignee: TEIJIN FRONTIER CO., LTD., Osaka (JP)

( * ) Notice: Subject to any disclaimer, the term of this patent is extended or adjusted under 35 U.S.C. 154(b) by 439 days.

(21) Appl. No.: 14/111,363

(22) PCT Filed: Apr. 18, 2012

(86) PCT No.: PCT/JP2012/060451
§ 371 (c)(1),
(2), (4) Date: Oct. 11, 2013

(87) PCT Pub. No.: WO2012/147582
PCT Pub. Date: Nov. 1, 2012

(65) Prior Publication Data
US 2014/0038483 A1 Feb. 6, 2014

(30) Foreign Application Priority Data

Apr. 25, 2011 (JP) ................................. 2011-097358

(51) Int. Cl.
| | | |
|---|---|---|
| *D06M 15/227* | (2006.01) | |
| *D06M 13/46* | (2006.01) | |
| *D06M 15/277* | (2006.01) | |
| *D06M 16/00* | (2006.01) | |
| *C08F 220/24* | (2006.01) | |
| *D06M 15/356* | (2006.01) | |
| *D06M 101/32* | (2006.01) | |

(52) U.S. Cl.
CPC ......... *D06M 15/227* (2013.01); *C08F 220/24* (2013.01); *D06M 13/46* (2013.01); *D06M 15/277* (2013.01); *D06M 15/3562* (2013.01); *D06M 16/00* (2013.01); *D06M 2101/32* (2013.01); *Y10T 442/2008* (2015.04); *Y10T 442/227* (2015.04)

(58) Field of Classification Search
CPC ... C08F 220/24; D06M 13/46; D06M 15/227; D06M 15/3562; D06M 16/00; D06M 2101/32; Y10T 442/2008; Y10T 442/227
USPC ...................... 442/60, 80, 82, 90, 92, 94, 95
See application file for complete search history.

(56) References Cited

U.S. PATENT DOCUMENTS

| | | | | |
|---|---|---|---|---|
| 3,968,066 A | * | 7/1976 | Mueller ............. | C08G 18/3855 524/100 |
| 5,143,991 A | | 9/1992 | Amimoto et al. | |
| 2002/0025749 A1 | * | 2/2002 | Shimizu ............... | C08F 290/06 442/118 |
| 2009/0029617 A1 | * | 1/2009 | Akimori ................... | B32B 5/26 442/208 |
| 2011/0027593 A1 | | 2/2011 | Matsuda et al. | |

FOREIGN PATENT DOCUMENTS

| | | | | | |
|---|---|---|---|---|---|
| JP | 60-88178 | A | | 5/1985 | |
| JP | 4241171 | A | | 8/1992 | |
| JP | 559669 | A | | 3/1993 | |
| JP | 681271 | A | | 3/1994 | |
| JP | 9-296371 | A | | 11/1997 | |
| JP | 2002201568 | A | | 7/2002 | |
| JP | 200341485 | A | | 2/2003 | |
| JP | 2004-52167 | A | | 2/2004 | |
| JP | 2004-211268 | A | | 7/2004 | |
| JP | 2004-270097 | A | | 9/2004 | |
| JP | 2005-330354 | A | | 12/2005 | |
| JP | 2006152508 | A | | 6/2006 | |
| JP | 2006200082 | A | | 8/2006 | |
| JP | 2007270374 | A | | 10/2007 | |
| JP | 2008163474 | A | | 7/2008 | |
| JP | 2010-150693 | A | | 7/2010 | |
| JP | 2010-255143 | A | | 11/2010 | |
| JP | 2012214759 | A | | 11/2012 | |
| JP | 2016-108675 | A | * | 6/2016 | .......... D06M 15/277 |
| TW | I272331 | B | | 2/2007 | |
| TW | I323753 | B | | 4/2010 | |
| WO | 2009/084530 | A1 | | 7/2009 | |
| WO | 2009/123051 | A1 | | 10/2009 | |

OTHER PUBLICATIONS

Communication dated Oct. 30, 2014 from the European Patent Office in counterpart application No. 12776037.9.
Tetsuya Okano, "The mention of sterilization and surfactant", Kao Hygine Solution, No. 7, 2004, (4 pages total including partial translation).

* cited by examiner

*Primary Examiner* — Arti Singh-Pandey
(74) *Attorney, Agent, or Firm* — Sughrue Mion, PLLC

(57) ABSTRACT

An object is to provide a cloth containing an organic fiber, which is excellent in the oil repellency, dirt-removal property by washing and water-absorbing property, and a textile product produced using the cloth. A means for solution is attaching a specific fluorine-containing polymer to a cloth containing an organic fiber, with a quaternary ammonium salt if desired, and thus making the water-absorbing property in accordance with JIS L1018A method (the instillation method) 60 seconds or less and the oil repellency in accordance with AATCC118-1992 grade 4 or higher.

2 Claims, No Drawings

CLOTH CONTAINING AN ORGANIC FIBER AND HAVING A FLUORINE COMPOUND ATTACHED TO THE CLOTH, AND TEXTILE PRODUCT COMPRISING THE CLOTH

TECHNICAL FIELD

This invention relates to a cloth containing an organic fiber, which is excellent in oil repellency, dirt-removal property by washing and water-absorbing property, and a textile product produced using the cloth.

BACKGROUND ART

Cloths containing an organic fiber such as a polyester fiber are widely used for various clothes such as uniforms, white coats and other apparel. In the use of such clothes, a method for preventing the cloth from getting dirty, a method for making it easier to remove dirt on the cloth by washing and the like have been conventionally proposed as an antifouling technique.

For example, in SR (soil release) treatment method to coat the surface of the fiber constituting a cloth with an SR treatment agent and make the surface hydrophilic, the surface of the fiber becomes hydrophilic, and it becomes possible to remove dirt easily by washing. However, there has been a problem that it is not possible to prevent a fiber from getting dirty, when SR treatment is conducted on the fiber.

Further, in SG (soil guard) treatment method to coat the surface of a fiber with an oil repellent agent, the surface of the fiber becomes oil repellent, and it becomes possible to prevent the fiber from getting dirty. However, when SG treatment is conducted on a fiber, there has been a problem that the water-absorbing property of the fiber deteriorates because the fiber surface becomes water repellent, and the dirt becomes difficult to remove even by washing, while the fiber is less likely to get dirty. In this connection, an oil spot such as sebum causes the growth of bacteria, which is the cause of a bad smell, discoloration and the like.

Furthermore, SG/SR treatment in which a fluorine SR agent having a hydrophilic group and a fluorine SG agent having no hydrophilic group are used in combination has been also proposed (for example, please refer to Patent Document 1 and Patent Document 2). When SG/SR treatment is conducted on a fiber, however, the fiber becomes hydrophilic due to the SR agent, while the fiber becomes oil repellent due to the SG agent. Since the hydrophilic property and the oil repellency property are conflicting techniques, there has been a problem that the SG effect and the SR effect counteract each other.

On the other hand, in the use as clothes, it is required to improve the water-absorbing property of a cloth to improve the wearing comfort. However, because the water-absorbing property and the oil repellency property are conflicting properties, only a few cloths having both properties have been proposed so far.

In addition, it was recently found out that fluorine compounds such as perfluorooctanoic acid (which is sometimes called "PFOA") and perfluorooctanesulfonic acid (which is sometimes called "PFOS") may adversely affect the environment and living things, and the reduction thereof has become an issue. A textile product using a fluorine water repellent agent which does not contain such a compound or contains as little amount thereof as possible is desired.

RELATED ART DOCUMENTS

Patent Documents

Patent Document 1: JP-A-2010-255143
Patent Document 2: JP-A-9-296371

SUMMARY OF INVENTION

Problems that the Invention is to Solve

This invention was accomplished in view of the above background, and an object thereof is to provide a cloth containing an organic fiber, which is excellent in oil repellency, dirt-removal property by washing and water-absorbing property, and which is preferably also excellent in antibacterial property while environmental problems are considered, and a textile product produced using the cloth.

Means for Solving the Problems

The present inventors conducted extensive research to achieve the above object. As a result, the inventors found that it is possible to obtain a cloth containing an organic fiber, which is excellent in oil repellency, dirt-removal property by washing and water-absorbing property, and which is also excellent in antibacterial property while environmental problems are considered, by adding a specific fluorine polymer to the cloth containing an organic fiber. The inventors further conducted extensive research, and accomplished the invention.

Thus, according to the invention, "a cloth containing an organic fiber, which is characterized in that a fluorine-containing polymer is attached to the cloth, the water-absorbing property in accordance with the JIS L1018A method (the instillation method) is 60 seconds or less, and oil repellency in accordance with AATCC118-1992 is grade 4 or higher" is provided.

In this connection, the dirt-removal property by washing (antifouling SR property) in accordance with the diamond paste method (the standard JCFA TM-104 of Japan Chemical Fibers Association) is preferably grade 3 or higher. Further, in the fluorine polymer, the concentration of perfluorooctanoic acid or perfluorooctanesulfonic acid is preferably 5 ng/g or less. Furthermore, it is preferable that the fluorine-containing polymer is attached to the cloth with a quaternary ammonium salt. In addition, it is preferable that the fluorine-containing polymer is attached to a single fiber of the organic fiber contained in the cloth in a film form. Further, it is preferable that the fluorine-containing polymer is attached to the cloth with a melamine binder resin.

In addition, the fluorine-containing polymer preferably contains:

(a) a fluorine-containing monomer represented by the general formula:

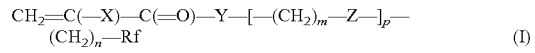

$$CH_2=C(-X)-C(=O)-Y-[-(CH_2)_m-Z-]_p-(CH_2)_n-Rf \quad (I)$$

[in the formula, X is a hydrogen atom, a methyl group, a fluorine atom, a chlorine atom, a bromine atom, an iodine atom, a CFX1X2 group (here, X1 and X2 are a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group, Y is —O— or —NH—, Z is a direct bond, —S— or —SO$_2$—, Rf is a fluoroalkyl group having 1 to 12 carbon atoms, m is 1 to 10, n is 0 to 10 and p is 0 or 1], and (b) an alkoxy group-containing monomer represented by the general formula:

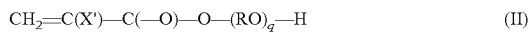

$$CH_2=C(X')-C(-O)-O-(RO)_q-H \qquad (II)$$

[in the formula, X' is a hydrogen atom or a methyl group, R is an alkylene group having 2 to 4 carbon atoms in which a part or all of the hydrogen atoms may be substituted with a hydroxyl group, and q is an integer of 1 to 50], as essential components.

Further, it is preferable that the bacteriostatic activity value is 2.2 or more or the bactericidal activity value is 0 or more in the JIS L1902 bacterial suspension absorption method (test bacterium: *Staphylococcus aureus*). In addition, the organic fiber is preferably a polyester fiber. Regarding the organic fiber, the single fiber fineness is preferably 4.0 dtex or less. In addition, the organic fiber is preferably a false twisted crimped textured yarn.

In addition, in the invention, the cloth is preferably a knitted fabric having densities of 40 courses/2.54 cm or more and 30 wales/2.54 cm or more, or a woven fabric having densities of 40 yarns/2.54 cm or more both for the warp and weft yarns.

Furthermore, according to the invention, a textile product produced using the cloth is provided.

Effects of the Invention

According to the invention, a cloth containing an organic fiber, which is excellent in oil repellency, dirt-removal property by washing and water-absorbing property, and also excellent in antibacterial property while environmental problems are considered, and a textile product produced using the cloth, are obtained.

MODES FOR CARRYING OUT THE INVENTION

Embodiments of the invention will be described in detail hereinafter.

The cloth of this invention is a cloth containing an organic fiber in which a fluorine-containing polymer is attached to the cloth, the water-absorbing property in accordance with the JIS L1018A method (the instillation method) is 60 seconds or less (more preferably 1 to 30 seconds, and particularly preferably 1 to 10 seconds), and oil repellency in accordance with AATCC118-1992 is grade 4 or higher (more preferably grade 5 to 8). When the water-absorbing property is more than 60 seconds, there is a possibility of not only the impairment of the wearing comfort but also the deterioration of the dirt-removal property by washing, which is not preferable. Further, when oil repellency in accordance with AATCC118-1992 is lower than grade 4, the fiber gets dirty more easily, which is not preferable. In this regard, the water-absorbing property and oil repellency described above can be achieved by attaching the fluorine-containing polymer as described below to the cloth.

Examples of the organic fiber include synthetic fibers such as a polyester fiber, a polyamide fiber, an aramid fiber, a polyvinyl chloride fiber, a polyacrylonitrile fiber, a polypropylene fiber and a polyethylene fiber, recycled fibers such as a rayon fiber, natural fibers such as a cotton fiber, a wool fiber and a silk fiber, and combined fibers thereof. Among them, a polyester fiber is preferable.

The polyester fiber is produced from a dicarboxylic acid component and a diglycol component. It is preferable to mainly use terephthalic acid as the dicarboxylic acid component, and it is preferable to mainly use one or more alkylene glycols selected from ethylene glycol, trimethylene glycol and tetramethylene glycol as the diglycol component. Further, the polyester resin may contain a third component in addition to the dicarboxylic acid component and the glycol component. As the third component, one or more kinds of a cation dye-dyeable anion component, for example, sodium sulfoisophthalate; dicarboxylic acid other than terephthalic acid, for example, isophthalic acid, naphthalenedicarboxylic acid, adipic acid or sebacic acid; and a glycol compound other than alkylene glycol, for example, diethylene glycol, polyethylene glycol, bisphenol A, or bisphenol sulfone, may be used. The polyester may be a materially-recycled or chemically-recycled polyester, or polyethylene terephthalate, polylactic acid or stereo complex polylactic acid, which is produced by using a monomer component obtained from biomass, namely a biological substance, as a raw material. Further, it may be a polyester obtained by using a catalyst containing a specific phosphorous compound and a titanium compound, such as polyesters described in JP-A-2004-270097 and JP-A-2004-211268.

The shape of the organic fiber may be a short fiber or a long fiber (multifilament), but a long fiber is preferable in order to improve the water-absorbing property. Further, the organic fiber may be a false twisted crimped textured yarn in which a general false twisting crimping process was conducted, or a composite yarn in which two or more kinds of constituent yarn are processed by air combination or processed by composite false twisting texturing. In particular, when the organic fiber is a false twisted crimped textured yarn, the water-absorbing property of the cloth further improves, which is preferable.

In this regard, the single fiber fineness, total fineness and single yarn number of the multifilament are preferably within the ranges of: 0.0001 to 10.0 dtex for the single fiber fineness, 20 to 500 dtex for the total fineness, and 10 to 200 yarns for the single yarn number. In particular, it is particularly preferable that the single yarn fiber fineness is 4.0 dtex or less (more preferably 0.0001 to 2.0 dtex) in view of improving the water-absorbing property of the cloth.

Further, in the organic fiber, the cross sectional shape of the single yarn fiber is not limited, and may be an irregular cross sectional shape such as triangular, flat, flat with constrictions described in JP-A-2004-52167, cross, hexangular or hollow, as well as a general circular cross section.

The cloth of the invention may be constituted of one kind of fiber only, but the cloth may be constituted of, for example, a cotton fiber, a nylon fiber or a rayon fiber in combination with a polyester fiber.

In addition, regarding the cloth of the invention, the structure of the cloth is not particularly limited, and may be a general woven fabric structure, a knitted fabric structure, or a nonwoven fabric structure. Examples of the weft-knitting structure include flat knitting, rib knitting, interlock knitting, purl knitting, tuck knitting, float knitting, half cardigan knitting, lace knitting, and pile knitting; examples of the warp-knitting structure include single Denbigh knitting, single atlas knitting, double cord knitting, half knitting, half base knitting, satin knitting, half tricot knitting, fleece knitting and jacquard knitting; and examples of the woven fabric structure include three foundation weaves such as flat weave, twill weave and sateen weave, modified weaves, single-backed double weaves such as warp-double weave and weft-double weave, warp velvet and the like; however, the structures are not limited to the above examples. Regarding the number of layers, it may be a monolayer, or a multilayer including two or more layers. In this regard, these woven fabrics and knitted fabrics can be produced by general methods.

Furthermore, regarding the cloth of the invention, the cloth is preferably a knitted fabric having densities of 40 courses/2.54 cm or more and 30 wales/2.54 cm or more (more preferably 40 to 200 courses/2.54 cm and 30 to 200 wales/2.54 cm), or a woven fabric having densities of 40 yarns/2.54 cm or more both for the warp and weft yarns (more preferably, 50 to 200 yarns/2.54 cm both for the warp and weft yarns), because the water-absorbing property and the oil repellency improve.

In addition, the cloth may be appropriately treated with a post-processing agent within the scope in which the object of the invention is not impaired, for example for general dyeing processing, weight-reducing processing, raising processing, water repellent processing, calendar processing, emboss processing, thermal storage processing, sweat-absorbent processing and minus ion processing.

The fluorine-containing polymer to be attached to the cloth of the invention is preferably a fluorine polymer in which the concentration of perfluorooctanoic acid (PFOA) and/or perfluorooctanesulfonic acid (PFOS) is 5 ng/g or less. Here, the amount of PFOA or PFOS can be measured by high-performance liquid chromatography-mass spectrometry (LC-MS). Further, it means that, when only one of PFOA and PFOS is contained, the content thereof is 5 ng/g or less, and when both PFOA and PFOS are contained, the total amount thereof is 5 ng/g or less.

As such a fluorine-containing polymer that is excellent in the water-absorbing property and oil repellency and has a concentration of PFOA or PFOS of 5 ng/g or less, those described in WO 2009/123051 and the like are preferable.

That is, a fluorine-containing polymer, which contains:

(a) a fluorine-containing monomer represented by the general formula:

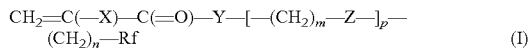

(I)

[in the formula, X is a hydrogen atom, a methyl group, a fluorine atom, a chlorine atom, a bromine atom, an iodine atom, a CFX1X2 group (here, X1 and X2 are a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group, Y is —O— or —NH—, Z is a direct bond, —S— or —SO$_2$—, Rf is a fluoroalkyl group having 1 to 12 carbon atoms, m is 1 to 10, n is 0 to 10 and p is 0 or 1], and (b) an alkoxy group-containing monomer represented by the general formula:

CH$_2$=C(X')—C(=O)—O—(RO)$_q$—H  (II)

[in the formula, X' is a hydrogen atom or a methyl group, R is an alkylene group having 2 to 4 carbon atoms in which a part or all of the hydrogen atoms may be substituted with a hydroxyl group, and q is an integer of 1 to 50], as essential components, is preferable.

Such a fluorine-containing polymer has excellent oil repellency and water-absorbing property and can give the cloth oil repellency, dirt-removal property by washing and water-absorbing property.

The fluorine-containing monomer (a) is represented by the general formula:

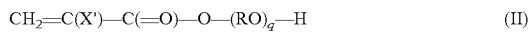

(I)

[in the formula, X is a hydrogen atom, a methyl group, a linear or branched alkyl group having 1 to 21 carbon atoms, a fluorine atom, a chlorine atom, a bromine atom, an iodine atom, a CFX1X2 group (here, X1 and X2 are a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group, Y is —O— or —NH—, Z is a direct bond, —S— or —SO$_2$—, Rf is a fluoroalkyl group having 1 to 12 carbon atoms, m is 1 to 10, n is 0 to 10 and p is 0 or 1]. In the general formula (I), p is preferably 0.

A preferable example of X is a hydrogen atom.

In the fluorine-containing monomer (a), Rf group is generally a perfluoroalkyl group and/or a partially-fluorinated fluoroalkyl group. Rf group is preferably a perfluoroalkyl group. The carbon atom number of Rf group is 1 to 12 (preferably 1 to 6). Examples of Rf group are —CF$_3$, —CF$_2$CF$_3$, —CF$_2$CF$_2$CF$_3$, —CF(CF$_3$)$_2$, —CF$_2$CF$_2$CF$_2$CF$_3$, —CF$_2$CF(CF$_3$)$_2$, —C(CF$_3$)$_3$, —(CF$_2$)$_4$CF$_3$, —(CF$_2$)$_2$CF(CF$_3$)$_2$, —CF$_2$C(CF$_3$)$_3$, —CF(CF$_3$)CF$_2$CF$_2$CF$_3$, —(CF$_2$)$_5$CF$_3$ and the like.

Also, m is 1 to 10, for example, 2 to 5, and n is 0 to 10, for example, 1 to 6, and particularly preferably 2 to 5.

The fluorine-containing monomer (a) may be used alone, or two or more kinds thereof may be mixed and used.

Examples of the fluorine-containing monomer (a) are as follows.

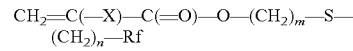

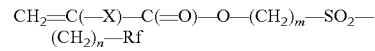

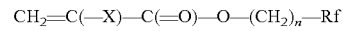

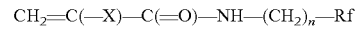

[In the above formulae, X is a hydrogen atom, a methyl group, a fluorine atom, a chlorine atom, a bromine atom, an iodine atom, a CFX1X2 group (here, X1 and X2 are a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group, Rf is a fluoroalkyl group of 1 to 6, m is 1 to 10 and n is 0 to 10.]

As specific examples of the fluorine-containing monomer (a), the following examples are mentioned, but the fluorine-containing monomer (a) is not limited to those specific examples.

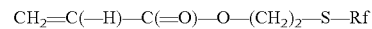

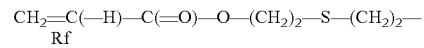

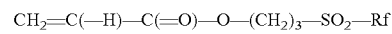

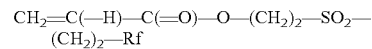

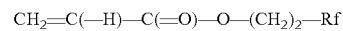

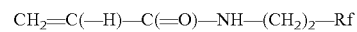

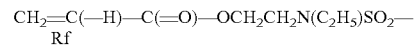

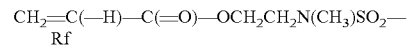

CH$_2$=C(—H)—C(=O)—OCH$_2$CH(OCOCH$_3$)CH$_2$—Rf

CH$_2$=C(—CH$_3$)—C(=O)—O—(CH$_2$)$_2$—S—Rf

CH$_2$=C(CH$_3$)—C(=O)—O—(CH$_2$)$_2$—S—(CH$_2$)$_2$—Rf

CH$_2$=C(—CH$_3$)—C(=O)—O—(CH$_2$)$_3$—SO$_2$—Rf

CH$_2$=C(CH$_3$)—C(=O)—O—(CH$_2$)$_2$—SO$_2$—(CH$_2$)$_2$—Rf

CH$_2$=C(—CH$_3$)—C(=O)—O—(CH$_2$)$_2$—Rf

CH$_2$=C(—CH$_3$)—C(=O)—NH—(CH$_2$)$_2$—Rf

CH$_2$=C(—CH$_3$)—C(=O)—OCH$_2$CH$_2$N(C$_2$H$_5$)SO$_2$—Rf

CH$_2$=C(—CH$_3$)—C(=O)—OCH$_2$CH$_2$N(CH$_3$)SO$_2$—Rf

CH$_2$=C(—CH$_3$)—C(=O)—OCH$_2$CH(OCOCH$_3$)CH$_2$—Rf

CH$_2$=C(—F)—C(=O)—O—(CH$_2$)$_2$—S—Rf

CH$_2$=C(—F)—C(=O)—O—(CH$_2$)$_2$—S—(CH$_2$)$_2$—Rf

CH$_2$=C(—F)—C(=O)—O—(CH$_2$)$_2$—SO$_2$—Rf

CH$_2$=C(—F)—C(=O)—O—(CH$_2$)$_2$—SO$_2$—(CH$_2$)$_2$—Rf

CH$_2$=C(—F)—C(=O)—O—(CH$_2$)$_2$—Rf

CH$_2$=C(—F)—C(=O)—NH—(CH$_2$)$_2$—Rf

CH$_2$=C(—Cl)—C(=O)—O—(CH$_2$)$_2$—S—Rf

CH$_2$=C(—Cl)—C(=O)—O—(CH$_2$)$_2$—S—(CH$_2$)$_2$—Rf

CH$_2$=C(—Cl)—C(=O)—O—(CH$_2$)$_2$—SO$_2$—Rf

CH$_2$=C(—Cl)—C(=O)—O—(CH$_2$)$_2$—SO$_2$—(CH$_2$)$_2$—Rf

CH$_2$=C(—Cl)—C(=O)—O—(CH$_2$)$_2$—Rf

CH$_2$=C(—Cl)—C(=O)—NH—(CH$_2$)$_2$—Rf

CH$_2$=C(—CF$_3$)—C(=O)—O—(CH$_2$)$_2$—S—Rf

CH$_2$=C(—CF$_3$)—C(=O)—O—(CH$_2$)$_2$—S—(CH$_2$)$_2$—Rf

CH$_2$=C(CF$_3$)—C(=O)—O—(CH$_2$)$_2$—SO$_2$—Rf

CH$_2$=C(CF$_3$)—C(=O)—O—(CH$_2$)$_2$—SO$_2$—(CH$_2$)$_2$—Rf

CH$_2$=C(—CF$_3$)—C(=O)—O—(CH$_2$)$_2$—Rf

CH$_2$=C(—CF$_3$)—C(=O)—NH—(CH$_2$)$_2$—Rf

CH$_2$=C(—CF$_2$H)—C(=O)—O—(CH$_2$)$_2$—S—Rf

CH$_2$=C(—CF$_2$H)—C(=O)—O—(CH$_2$)$_2$—S—(CH$_2$)$_2$—Rf

CH$_2$=C(—CF$_2$H)—C(=O)—O—(CH$_2$)$_2$—SO$_2$—Rf

CH$_2$=C(—CF$_2$H)—C(=O)—O—(CH$_2$)$_2$—SO$_2$—(CH$_2$)$_2$—Rf

CH$_2$=C(—CF$_2$H)—C(=O)—O—(CH$_2$)$_2$—Rf

CH$_2$=C(—CF$_2$H)—C(=O)—NH—(CH$_2$)$_2$—Rf

CH$_2$=C(—CN)—C(=O)—O—(CH$_2$)$_2$—S—Rf

CH$_2$=C(—CN)—C(=O)—O—(CH$_2$)$_2$—S—(CH$_2$)$_2$—Rf

CH$_2$=C(—CN)—C(=O)—O—(CH$_2$)$_2$—SO$_2$—Rf

CH$_2$=C(—CN)—C(=O)—O—(CH$_2$)$_2$—SO$_2$—(CH$_2$)$_2$—Rf

CH$_2$=C(—CN)—C(=O)—O—(CH$_2$)$_2$—Rf

CH$_2$=C(—CN)—C(=O)—NH—(CH$_2$)$_2$—Rf

CH$_2$=C(—CF$_2$CF$_3$)—C(=O)—O—(CH$_2$)$_2$—S—Rf

CH$_2$=C(—CF$_2$CF$_3$)—C(=O)—O—(CH$_2$)$_2$—S—(CH$_2$)$_2$—Rf

CH$_2$=C(—CF$_2$CF$_3$)—C(=O)—O—(CH$_2$)$_2$—SO$_2$—Rf

CH$_2$=C(—CF$_2$CF$_3$)—C(=O)—O—(CH$_2$)$_2$—SO$_2$—(CH$_2$)$_2$—Rf

CH$_2$=C(—CF$_2$CF$_3$)—C(=O)—O—(CH$_2$)$_2$—Rf

CH$_2$=C(—CF$_2$CF$_3$)—C(=O)—NH—(CH$_2$)$_2$—Rf

CH$_2$=C(—F)—C(=O)—O—(CH$_2$)$_3$—S—Rf

CH$_2$=C(—F)—C(=O)—O—(CH$_2$)$_3$—S—(CH$_2$)$_2$—Rf

CH$_2$=C(—F)—C(=O)—O—(CH$_2$)$_3$—SO$_2$—Rf

CH$_2$=C(—F)—C(=O)—O—(CH$_2$)$_3$—SO$_2$—(CH$_2$)$_2$—Rf

CH$_2$=C(—F)—C(=O)—O—(CH$_2$)$_3$—Rf

CH$_2$=C(—F)—C(=O)—NH—(CH$_2$)$_3$—Rf

CH$_2$=C(—Cl)—C(=O)—O—(CH$_2$)$_3$—S—Rf

CH$_2$=C(—Cl)—C(=O)—O—(CH$_2$)$_3$—S—(CH$_2$)$_2$—Rf

CH$_2$=C(—Cl)—C(=O)—O—(CH$_2$)$_3$—SO$_2$—Rf

CH$_2$=C(—Cl)—C(=O)—O—(CH$_2$)$_3$—SO$_2$—(CH$_2$)$_2$—Rf

CH$_2$=C(—CF$_3$)—C(=O)—O—(CH$_2$)$_3$—S—Rf

CH$_2$=C(—CF$_3$)—C(=O)—O—(CH$_2$)$_3$—S—(CH$_2$)$_2$—Rf

CH$_2$=C(—CF$_3$)—C(=O)—O—(CH$_2$)$_3$—SO$_2$—Rf

CH$_2$=C(CF$_3$)—C(=O)—O—(CH$_2$)$_3$—SO$_2$—(CH$_2$)$_2$—Rf

CH$_2$=C(—CF$_2$H)—C(=O)—O—(CH$_2$)$_3$—S—Rf

CH$_2$=C(—CF$_2$H)—C(=O)—O—(CH$_2$)$_3$—S—(CH$_2$)$_2$—Rf $CH_2=C(-CF_2H)-C(=O)-O-(CH_2)_3-SO_2-Rf$ $CH_2=C(-CF_2H)-C(=O)-O-(CH_2)_3-SO_2-(CH_2)_2-Rf$ $CH_2=C(-CN)-C(=O)-O-(CH_2)_3-S-Rf$ $CH_2=C(-CN)-C(=O)-O-(CH_2)_3-S-(CH_2)_2-Rf$ $CH_2=C(-CN)-C(=O)-O-(CH_2)_3-SO_2-Rf$ $CH_2=C(-CN)-C(=O)-O-(CH_2)_3-SO_2-(CH_2)_2-Rf$ $CH_2=C(-CF_2CF_3)-C(=O)-O-(CH_2)_3-S-Rf$ $CH_2=C(-CF_2CF_3)-C(=O)-O-(CH_2)_3-S-(CH_2)_2-Rf$ $CH_2=C(-CF_2CF_3)-C(=O)-O-(CH_2)_3-SO_2-Rf$ $CH_2=C(-CF_2CF_3)-C(=O)-O-(CH_2)_2-SO_2-(CH_2)_2-Rf$

[In the above formulae, Rf is a fluoroalkyl group of 1 to 6.]

The alkoxy group-containing monomer (b) is a non-fluorine monomer and is a compound (alkylene glycol (meth)acrylate) represented by the general formula:

$$CH_2=C(X')-C(=O)-O-(RO)_q-H \quad (II)$$

[in the formula, X' is a hydrogen atom or a methyl group, R is an alkylene group having 2 to 4 carbon atoms in which a part or all of the hydrogen atoms may be substituted with a hydroxyl group, and q is an integer of 1 to 50.

In the alkoxy group-containing monomer (b), q is preferably 1 to 30, for example, 2 to 10, and particularly 2 to 5.

In the general formula (II), R is preferably ethylene or propylene, and particularly ethylene. R's in the general formula (II) may be a combination of two or more kinds of alkylene. In this case, at least one R is preferably ethylene. As the combination of R's, the combination of ethylene group/propylene group and the combination of ethylene group/butylene group are mentioned.

The alkoxy group-containing monomer (b) may be a mixture of two or more kinds.

As specific examples of the alkoxy group-containing monomer (b), the following examples can be mentioned, but the alkoxy group-containing monomer (b) is not limited to the specific examples.

$CH_2=CHCOO-(CH_2CH_2O)_9-H$ $CH_2=C(CH_3)COO-(CH_2CH_2O)_9-H$ $CH_2=C(CH_3)COO-(CH_2CH_2O)_{23}-H$ $CH_2=C(CH_3)COO-(CH_2CH_2O)_{50}-H$ $CH_2=C(CH_3)COO-(CH_2CH(CH_3)O)_9-H$ $CH_2=CHCOO-(CH_2CH(CH_3)O)_9-H$ $CH_2=C(CH_3)COO-(CH_2CH(CH_3)O)_9-H$ $CH_2=C(CH_3)COO-(CH_2CH_2O)_5-(CH_2CH(CH_3)O)_2-H$ $CH_2=C(CH_3)COO-(CH_2CH_2O)_8-(CH_2CH(CH_3)O)_6-H$

The fluorine polymer may contain (c) a crosslinkable monomer. The crosslinkable monomer (c) has at least two of reactive groups and/or carbon-carbon double bonds, and may be a compound containing no fluorine. The crosslinkable monomer (c) may be a compound having at least two carbon-carbon double bonds, or a compound having at least one carbon-carbon double bond and at least one reactive group. Examples of the reactive group are a hydroxyl group, an epoxy group, a chloromethyl group, blocked isocyanate, a carboxyl group and the like.

The crosslinkable monomer (c) is preferably a non-fluorine crosslinkable monomer, and particularly preferably di(meth)acrylate.

The crosslinkable monomer (c) is preferably a compound (alkylene glycol di(meth)acrylate) represented by the general formula:

$$CH_2=C(X'')-C(=O)-O-(R''O)_q-C(=O)-C(X'')=CH_2 \quad (III)$$

[in the formula, each X'' is a hydrogen atom or a methyl group; R'' is an alkylene group having 2 to 10 carbon atoms in which a part or all of the hydrogen atoms may be substituted with a hydroxyl group, and q is an integer of 1 to 50]. The carbon atom number of R'' is 2 to 10, for example, 2 to 6, and particularly 2 to 4. R'' is preferably an ethylene group.

Specific examples of the alkylene glycol di(meth)acrylate represented by the formula (III) are as follows.

$CH_2=C(CH_3)COO-(CH_2CH_2O)_5-COC(CH_3)=CH_2$ $CH_2=CHCOO-(CH_2CH_2O)_9-COCH=CH_2$ $CH_2=C(CH_3)COO-(CH_2CH(CH_3)O)_{12}-COCH=CH_2$ $CH_2=CHCOO-(CH_2CH_2O)_5-(CH_2CH(CH_3)O)_3-COCH=CH_2$ $CH_2=C(CH_3)COO-(CH_2CH_2O)_{23}-OOC(CH_3)C=CH_2$ $CH_2=C(CH_3)COO-(CH_2CH_2O)_{20}-(CH_2CH(CH_3)O)_5-COCH=CH_2$

Other examples of the crosslinkable monomer (c) are diacetone(meth)acrylamide, (meth)acrylamide, N-methylol (meth)acrylamide, hydroxymethyl(meth)acrylate, hydroxyethyl(meth)acrylate, 3-chloro-2-hydroxypropyl(meth)acrylate, butadiene, chloroprene, glycidyl(meth)acrylate, 1,6-hexanediol acrylate, neopentyl glycol diacrylate and the like, but the crosslinkable monomer (c) is not limited to the examples.

Still other examples of the crosslinkable monomer (c) are glycerol(meth)acrylate, acetoacetoxyethyl(meth)acrylate, isocyanate group-containing (meth)acrylate such as 2-isocyanate ethylmethacrylate, or the (meth)acrylate thereof in which the isocyanate group is blocked with a blocking agent such as methyl ethyl ketoxime.

The crosslinkable monomer (c) may be a mixture of two or more kinds.

The fluorine-containing polymer may contain (d) a non-crosslinkable monomer. The non-crosslinkable monomer (d) is a monomer other than the alkoxy group-containing monomer (b), and is generally a non-fluorine monomer. The non-crosslinkable monomer (d) is preferably a monomer which does not contain fluorine and which has a carbon-carbon double bond. The non-crosslinkable monomer (d) is preferably a vinyl monomer containing no fluorine. In general, the non-crosslinkable monomer is a compound having one carbon-carbon double bond.

Examples of the non-crosslinkable monomer (d) are butadiene, chloroprene, a maleic acid derivative, vinyl halide such as vinyl chloride, ethylene, vinylidene halide such as vinylidene chloride, vinyl alkyl ether, styrene, alkyl(meth)acrylate, vinyl pyrrolidone and the like, but the non-crosslinkable monomer (d) is not limited to the examples.

The non-crosslinkable monomer (d) may be a (meth) acrylic acid ester containing an alkyl group. The carbon atom number of the alkyl group may be 1 to 30, for example, 6 to 30, and illustratively 10 to 30. For example, the non-crosslinkable monomer may be an acrylate represented by the general formula:

$CH_2=CA^1COOA^2$

[in the formula, $A^1$ is a hydrogen atom or a methyl group, and $A^2$ is an alkyl group represented by $C_nH_{2n+1}$ (n is 1 to 30)].

The fluorine-containing polymer contains 100 parts by weight of the fluorine-containing monomer (a). It is preferable that, relative to 100 parts by weight of the fluorine-containing monomer (a), the amount of the alkoxy group-containing monomer (b) is 10 to 400 parts by weight, for example, 25 to 150 parts by weight, and particularly 100 to 43 parts by weight, the amount of the crosslinkable monomer (c) is 30 parts by weight or less, for example, 0.1 to 20 parts by weight, and particularly 0.5 to 10 parts by weight, and the amount of the non-crosslinkable monomer (d) is 20 parts by weight or less, for example, 0.1 to 15 parts by weight, and particularly 0.5 to 10 parts by weight.

The weight-average molecular weight of the fluorine-containing polymer may be 1000 to 1000000, and preferably 5000 to 500000. The weight-average molecular weight is a value calculated by gel permeation chromatography with polystyrene calibration.

The polymerization of the fluorine-containing polymer is not particularly limited, and various polymerization methods such as bulk polymerization, solution polymerization, emulsion polymerization and radiation polymerization may be selected. For example, solution polymerization using an organic solvent, and emulsion polymerization using water or an organic solvent and water in combination are generally selected. A treatment liquid is prepared by the dilution with water, or the emulsification in water by adding an emulsifying agent, after the polymerization.

As the state of the fluorine-containing polymer before adding the fluorine-containing polymer to the cloth, it is preferable that the polymer is dispersed in water by desolventizing and then adding water after the polymerization (for example, solution polymerization or emulsion polymerization).

As the organic solvent, ketones such as acetone and methyl ethyl ketone, esters such as ethyl acetate and methyl acetate, glycols such as propylene glycol, dipropylene glycol monomethylether, dipropylene glycol, tripropylene glycol and polyethylene glycol having low molecular weight, alcohols such as ethyl alcohol and isopropanol, and the like are mentioned.

As the emulsifying agent for emulsion polymerization, or for emulsification in water by adding an emulsifying agent after the polymerization, various general emulsifying agents, which are anionic, cationic or non-ionic, can be used.

As a polymerization initiator, for example, a peroxide, an azo compound or a persulfate compound can be used. The polymerization initiator is generally water-soluble and/or oil-soluble.

Specific examples of the oil-soluble polymerization initiator are preferably 2,2'-azobis(2-methylpropionitrile), 2,2'-azobis(2-methylbutyronitrile), 2,2'-azobis(2,4-dimethylvaleronitrile), 2,2'-azobis(2,4-dimethyl4-methoxyvaleronitrile), 1,1'-azobis(cyclohexane-1-carbonitrile), dimethyl2,2'-azobis(2-methylpropionate), 2,2'-azobis(2-isobutyronitrile), benzoyl peroxide, di-tertiary-butyl peroxide, lauryl peroxide, cumene hydroperoxide, t-butyl peroxypivalate, diisopropyl peroxydicarbonate, t-butyl perpivalate and the like.

Further, specific examples of the water-soluble polymerization initiator are preferably 2,2'-azobisisobutylamidine dihydrochloride, 2,2'-azobis(2-methylpropionamidine) hydrochloride, 2,2'-azobis[2-(2-imidazolin-2-yl)propane] hydrochloride, 2,2'-azobis[2-(2-imidazolin-2-yl)propane] sulfate hydrate, 2,2'-azobis[2-(5-methyl-2-imidazolin-2-yl) propane] hydrochloride, potassium persulfate, barium persulfate, ammonium persulfate, hydrogen peroxide and the like.

The polymerization initiator is preferably an organic peroxide having a 10 hour half-life temperature of 40° C. or higher. The polymerization initiator is particularly preferably t-butyl peroxypivalate.

The polymerization initiator is used in an amount of 0.01 to 5 parts by weight relative to 100 parts by weight of the monomers.

Further, a chain transfer agent, for example, a mercapto group-containing compound may be used for the purposes of controlling the molecular weight, and specific examples thereof are 2-mercaptoethanol, thiopropionic acid, alkyl mercaptan and the like. The mercapto group-containing compound is used in an amount of 10 parts by weight or less, or 0.01 to 5 parts by weight, relative to 100 parts by weight of the monomers.

Specifically, the fluorine-containing polymer can be produced as follows.

In solution polymerization, a method for dissolving the monomers in an organic solvent, adding a polymerization initiator after the nitrogen substitution, and heat stirring, for example, at 40 to 120° C. for 1 to 10 hours is adopted. The polymerization initiator may be generally an oil-soluble polymerization initiator.

The organic solvent is inert to the monomers and dissolves the monomers, and examples thereof are acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane, trichlorotrifluoroethane and the like. The organic solvent is used in an amount of 50 to 2000 parts by weight, for example, 50 to 1000 parts by weight, relative to 100 parts by weight of the monomers in total.

In emulsion polymerization, a method for emulsifying the monomers in water in the presence of an emulsifying agent and the like, adding a polymerization initiator after the nitrogen substitution, and stirring and polymerizing at 40 to 80° C. for 1 to 10 hours is adopted. As the polymerization initiator, water-soluble compounds such as benzoyl peroxide, lauroyl peroxide, t-butyl perbenzoate, 1-hydroxycyclohexylhydro peroxide, 3-carboxypropionyl peroxide, acetyl peroxide, azobisisobutylamidine-dihydrochloride, azobisisobutyronitrile, sodium peroxide, potassium persulfate and ammonium persulfate, or oil-soluble compounds such as azobisisobutyronitrile, benzoyl peroxide, di-t-butyl peroxide, lauryl peroxide, cumene hydroperoxide, t-butylperoxypivalate and diisopropyl peroxydicarbonate are used. The polymerization initiator is used in an amount of 0.01 to 10 parts by weight relative to 100 parts by weight of the monomers.

In order to obtain an aqueous polymer dispersion excellent in the post-preparative stability, it is desired that the monomers are microparticulated in water using an emulsification device which can achieve strong fracturing energy such as a high-pressure homogenizer or an ultrasonic homogenizer, and polymerized using an oil-soluble polymerization initiator. Further, as the emulsifying agent, various emulsifying agents, which are anionic, cationic or non-ionic, can be used, and the emulsifying agent is used in an amount of 0.5 to 20 parts by weight relative to 100 parts by weight of the monomers. It is preferable to use anionic and/or non-ionic and/or cationic emulsifying agent(s). When the monomers are not completely compatible, it is preferable to add a compatibilizing agent, which dissolves these monomers sufficiently, for example a water-soluble organic solvent or a monomer having low molecular weight. The addition of a compatibilizing agent enables the improvement of the emulsifying property and the copolymerization property.

As the water-soluble organic solvent, acetone, methyl ethyl ketone, ethyl acetate, propylene glycol, dipropylene glycol monomethylether, dipropylene glycol, tripropylene glycol, ethanol and the like are mentioned, and the water-soluble organic solvent may be used in an amount of 1 to 50 parts by weight, for example, 10 to 40 parts by weight, relative to 100 parts by weight of water. Further, as the monomer having low molecular weight, methyl methacrylate, glycidyl methacrylate, 2,2,2-trifluoroethyl methacrylate and the like are mentioned, and the monomer having low molecular weight may be used in an amount of 1 to 50 parts by weight, for example, 10 to 40 parts by weight, relative to 100 parts by weight of the total amount of the monomers.

The treatment liquid containing the fluorine-containing polymer is preferably in the form of a solution, emulsion or aerosol. The treatment liquid consists of the fluorine-containing polymer and a medium (for example, liquid medium such as an organic solvent and water). In the treatment liquid, the concentration of the fluorine-containing polymer may be, for example, 0.01 to 50% by weight.

Here, when the fluorine-containing polymer is attached to the cloth with a quaternary ammonium salt by adding the quaternary ammonium salt to the treatment liquid, the cationic property of the fluorine-containing polymer improves due to the ionic effects of the quaternary ammonium salt. As a result, when the organic fiber constituting the cloth is a polyester fiber, the fluorine-containing polymer is more easily attached to the polyester fiber, which is anionically charged, and the oil repellency, dirt-removal property by washing and water-absorbing property further improve, which is preferable. Furthermore, a quaternary ammonium salt generally has an antibacterial property, and thus an antibacterial property is given to the cloth.

As such a quaternary ammonium salt, those described below are preferably used.

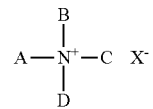

[Chem. 1]

Here, the substituents A, B, C and D are selected from the followings, and X represents halogen.

—$(CH_2)_n$—$C_nH_{n+1}$ n=2~30

—$CH_3$

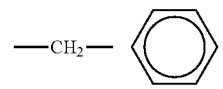

—$(CH_2$—$CH_2$—$O)_n$.H n=1~50

Further, when the fluorine-containing polymer is attached to the cloth with a binder resin by adding the binder resin to the treatment liquid, the fluorine-containing polymer is strongly attached to the fiber, and thus the durability of the oil repellency, dirt-removal property by washing, water-absorbing property, antibacterial property, and the like improve, which is preferable.

In this connection, the binder resin used is preferably a melamine binder resin. When a melamine binder resin is used as the binder resin, because the dissolution parameter SP value of a melamine binder resin is close to that of a polyester fiber, the fluorine-containing polymer is attached to the single fiber of a polyester fiber in a film form when the organic fiber constituting the cloth is a polyester fiber. As a result, not only the durability of the oil repellency, dirt-removal property by washing, water-absorbing property, antibacterial property, and the like but also the soft property of the cloth improves, which is preferable.

Here, when a silicone binder resin is used as the binder resin, there is a possibility that the water-absorbing property of the cloth may deteriorate because a silicone binder resin is hydrophobic. Further, when an isocyanate binder resin is used as the binder resin, there is a possibility that the durability of the oil repellency, dirt-removal property by washing, water-absorbing property, antibacterial property, and the like may deteriorate, and there is also a possibility that cyanogen gas may generate. In addition, when an acrylic binder resin is used as the binder resin, there is a possibility that the durability of the oil repellency, dirt-removal property by washing, water-absorbing property, antibacterial property, and the like may deteriorate because an acrylic binder resin is not crosslinkable.

The method for attaching the treatment liquid to the cloth may be a conventionally known method. In general, a method in which the treatment liquid is dispersed and diluted in an organic solvent or water, attached to the surface of the object to be treated by a known method such as immersion coating, spraying coating or foam coating, and dried, is adopted (surface treatment). In the case of the surface treatment, the ratio of the fluorine-containing polymer may be 0.01 to 3.0% by weight (more preferably 0.5 to 2.0% by weight) relative to the weight of the cloth.

Thus obtained cloth has a water-absorbing property of 60 seconds or less, and thus is excellent not only in the wearing comfort but also in the dirt-removal property by washing. At the same time, the cloth has an oil repellency in accordance with AATCC118-1992 of grade 4 or higher, which is excellent. In this connection, the dirt-removal property by washing (antifouling SR property) in accordance with the diamond paste method (the standard JCFA TM-104 of Japan Chemical Fibers Association) is preferably grade 3 or higher.

Further, when a fluorine-containing polymer in which the concentration of perfluorooctanoic acid and/or perfluorooctanesulfonic acid is 5 ng/g or less, is attached to the cloth, the environmental problems are considered, as described above.

Furthermore, when the fluorine-containing polymer is attached to the cloth with the quaternary ammonium salt, not only the oil repellency, dirt-removal property by washing and water-absorbing property further improve, but also an antibacterial property is given to the cloth. In this connection, it is preferable that the bacteriostatic activity value is 2.2 or more or the bactericidal activity value is 0 or more, in JIS L1902 bacterial suspension absorption method (test bacterium: *Staphylococcus aureus*).

The textile product of the invention is a textile product containing the cloth. Since the textile product contains the cloth, it is excellent in the oil repellency, dirt-removal property by washing and water-absorbing property. In particular, when the fluorine-containing polymer is attached to the cloth with the quaternary ammonium salt as described above, not only do the oil repellency, dirt-removal property by washing and water-absorbing property further improve, but also the antibacterial property is excellent. Such textile products include clothes such as shirts, uniforms, white uniforms for a food factory, office uniforms, uniforms for cosmetics salespeople, apparel clothes, sport clothes, men's clothes, women's clothes and school uniforms, curtains, pillowcases, car sheets and the like. Needless to say, the textile product of the invention is not limited to those examples.

EXAMPLES (1) Amount of PFOA or PFOS

The amount was measured under the following conditions and indicated by ng/g.

Sample: In the case of a cloth, 10 g thereof was immersion extracted for 5 hours at room temperature in a methanol solution, and analyzed.

Device: LC-MS/MS tandem type mass spectrometer TSQ-7000 (Thermo Electron Co., Ltd.)

High-performance liquid chromatography LC-10Avp (Shimadzu Corporation)

Column: Capcellpak C8 100 mm×2 mm i.d. (5 μm)
Mobile phases: A; 0.5 mmol/L ammonium acetate
B; acetonitrile
Flow rate: 0.2 mL/min, Sample infusion amount: 3 μL
CP temperature: 220° C., Ionization voltage: 4.5 kv, Ion multi: 1300 v
Ionization method: ESI-Negative (2) Antibacterial Property Regarding the cloth containing an organic fiber, the bacteriostatic activity value and the bactericidal activity value were measured in accordance with JIS L1902 bacterial suspension absorption method (test bacterium: *Staphylococcus aureus*). As the bacteriostatic activity value, the value of 2.2 or more was evaluated as passed (O), and the value less than 2.2 was evaluated as rejected (X). Further, as the bactericidal activity value, the value of 0 or more was evaluated as passed (O), and the value less than 0 was evaluated as rejected (X).

(3) Oil Repellency

The oil repellency was measured in accordance with AATCC118-1992. The grade of 4 or higher is evaluated as passed.

(4) Water-Absorbing Property

The water-absorbing property in accordance with JIS L1018A method (the instillation method) was measured. The value of 60 seconds or less is evaluated as passed.

(5) Dirt-Removal Property by Washing

The dirt-removal property by washing (antifouling SR property) was evaluated in accordance with the diamond paste method (the standard JCFA TM-104 of Japan Chemical Fibers Association). That is, a sample fragment (the above L-0 cloth or the above L-20 cloth) was spread on a flatly-placed filter paper, and 0.1 mL of the following dirt components was applied thereon and the sample fragment was left for 1 hour at room temperature.

(Dirt Components)
Carbon black 0.167 parts by mass
Liquid paraffin 0.625 parts by mass
Hardened beef tallow oil 0.208 parts by mass
Motor oil (manufactured by Shell) 100 parts by mass Next, this sample fragment was washed for 15 minutes using a twin tub electric washing machine (bath ratio 1:30, water temperature 40° C., the amount of the detergent Attack (product name, Kao Corporation) relative to 30 L of warm water 25 g), rinsed, dewatered and then air dried. The state of the stain remaining on the dried sample fragment was judged with gray scale for dirt (JIS L 0805: 2005).

Example 1

To a 100 ml four-necked flask having a reflux cooling tube, a nitrogen-introducing tube, a thermometer and a stirring device, 18.6 g of a fluorine-containing monomer $CH_2=CHC(=O)O—CH_2CH_2C_6F_{13}$, 11.4 g of polyethyleneglycol acrylate $CH_2=CHC(=O)O—(CH_2CH_2O)_n—H$ (BLEMMER AE90, manufactured by NOF Corporation, the average value of n is 2, it is described as AE90(b) below), 0.3 g of 2-mercaptoethanol and 45 g of methyl ethyl ketone (described as MEK below) were added, followed by nitrogen bubbling for 30 minutes. The internal temperature was raised to 50 to 65° C. under a nitrogen stream, 0.4 g of perbutyl PV (described as PV below) was added, and it was reacted for 6 hours at 60 to 65° C. MEK was distilled off at about 70° C. from the obtained solution under a reduced pressure, and a light yellow polymer residue was obtained. Then, 122.4 g of water was added, the internal temperature was kept at about 80° C. for 1 hour or more and then cooled, and an aqueous dispersion having a solid content concentration of the fluorine compound of about 20% by weight was prepared.

Next, a treatment liquid composed of 5 wt % (weight ratio to the treatment liquid) of the aqueous dispersion, 0.5 wt % (weight ratio to the treatment liquid) of a melamine binder resin, 0.1 wt % (weight ratio to the treatment liquid) of a catalyst and 94.4 wt % (weight ratio to the treatment liquid) of ion-exchanged water was obtained.

Further, a twill weave (the warp density of the gray fabric is 100 wales/2.54 cm and the weft density of the gray fabric is 50 courses/2.54 cm) was woven using a general polyethylene terephthalate false twisted crimped textured yarn having a total fineness of 330 dtex/96 flu as the warp yarn and a cotton spun yarn having a total fineness of 370 dtex (number of yarn of 16) as the weft yarn. The weave was refined at 80° C., a general dyeing processing was conducted at 130° C. for 30 minutes, the weave was dried and a cloth was obtained. The content of the polyethylene terephthalate false twisted crimped textured yarn contained in the cloth was 70% by weight.

Then, the cloth was impregnated in the treatment liquid, wrung with the wring ratio of 100%, dried at 130° C. for 5 minutes and further dried at 180° C. for 1 minute. The ratio of the fluorine-containing polymer relative to the cloth was 1% by weight.

The cloth obtained had an initial (before washing) water-absorbing property (JIS L-1096 A method) of 25 seconds, a dirt-removal property by washing of grade 3-4, and an oil repellency (AATCC 118-1992) of grade 5, which were excellent. Further, the total amount of perfluorooctanoic acid and perfluorooctanesulfonic acid of the fluorine-containing compound was less than 5 ng/g. In addition, the bacteriostatic activity value was 0.2 and the bactericidal activity value was −2.0, and the cloth did not have an antibacterial property. Furthermore, when the surface of the cloth obtained was observed with an electron microscope, the fluorine-containing compound was attached to a single fiber of the fiber constituting the cloth in a film form.

Next, when a uniform was obtained using the cloth and used, its water-absorbing property, dirt-removal property by washing and oil repellency were excellent.

Example 2

Except that 0.1% of the following quaternary ammonium salt was used in combination in the treatment liquid, similar procedures were conducted as in Example 1.

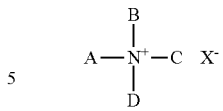

[Chem. 2]

Here, A, B, C, D and x are as follows.
A: —C$_{10}$H$_{21}$
B: —CH$_3$
C: —CH$_3$
D: —CH$_3$
X: Cl The cloth obtained had an initial (before washing) water-absorbing property (JIS L-1096 A method) of 8 seconds, a dirt-removal property by washing of grade 4-5, and an oil repellency (AATCC 118-1992) of grade 6, which were extremely excellent. Further, the total amount of perfluorooctanoic acid and perfluorooctanesulfonic acid of the fluorine-containing compound was less than 5 ng/g. In addition, the bacteriostatic activity value was 4.1 and the bactericidal activity value was 1.2, and the cloth had an excellent antibacterial property. Furthermore, when the surface of the cloth obtained was observed with an electron microscope, the fluorine-containing compound was attached to a single fiber of the fiber constituting the cloth in a film form.

Next, when a uniform was obtained using the cloth and used, its water-absorbing property, dirt-removal property by washing, oil repellency and antibacterial property were excellent.

Example 3

Except that 0.1% of the following quaternary ammonium salt was used in combination in the treatment liquid, similar procedures were conducted as in Example 1.

[Chem. 3]

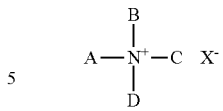

Here, A, B, C, D and X are as follows.
A: —C$_6$H$_{11}$
B: —CH$_3$
C:

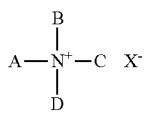

D: —(CH$_2$—CH$_2$—O)$_{10}$—H
X: Cl

The cloth obtained had an initial (before washing) water-absorbing property (JIS L-1096 A method) of 8 seconds, a dirt-removal property by washing of grade 4-5, and an oil repellency (AATCC 118-1992) of grade 6, which were extremely excellent. Further, the total amount of perfluorooctanoic acid and perfluorooctanesulfonic acid of the fluorine-containing compound was less than 5 ng/g. In addition, the bacteriostatic activity value was 4.2 and the bactericidal activity value was 1.15, and the cloth had an excellent antibacterial property. Furthermore, when the surface of the cloth obtained was observed with an electron microscope, the fluorine-containing compound was attached to a single fiber of the fiber constituting the cloth in a film form.

Next, when a uniform was obtained using the cloth and used, its water-absorbing property, dirt-removal property by washing, oil repellency and antibacterial property were excellent.

Comparative Example 1

Except that a fluorine water repellent agent (Nicca Chemical Co., Ltd. NDN-7E, the solid content concentration 20% by weight) was used as the fluorine-containing compound contained in the treatment liquid, similar procedures were conducted as in Example 1. The ratio of the fluorine-containing polymer relative to the cloth was 1% by weight.

The cloth obtained had an initial (before washing) water-absorbing property (JIS L-1096 A method) of 380 seconds, a dirt-removal property by washing of grade 1-2, and an oil repellency (AATCC 118-1992) of grade 8. Although the oil repellency (AATCC 118-1992) was excellent, the water-absorbing property and the dirt-removal performance by washing were inferior. Further, the total amount of perfluorooctanoic acid and perfluorooctanesulfonic acid was 15 ng/g. In addition, the bacteriostatic activity value was 0.1 and the bactericidal activity value was −2.2, and the cloth did not have an antibacterial property.

INDUSTRIAL APPLICABILITY

According to the invention, a cloth containing an organic fiber, which is excellent in the oil repellency, dirt-removal property by washing and water-absorbing property, and which is further excellent in the antibacterial property while the environmental problems are considered, and a textile product produced using the cloth are obtained. The industrial value thereof is extremely large.

The invention claimed is:

1. A cloth consisting of an organic fiber, wherein a fluorine compound is attached to the cloth, the water-absorbing property in accordance with the instillation method of JIS L1018A is 60 seconds or less, the oil repellency in accordance with AATCC118-1992 is grade 4 or higher, the fluorine compound is attached to a single fiber of the organic fiber contained in the cloth in a film form, the organic fiber is a polyester fiber, and the single fiber fineness of the organic fiber is 4.0 dtex or less, and the dirt-removal property by washing in accordance with the diamond paste method of the standard JCFA TM-104 of Japan Chemical Fibers Association is grade 3 or higher, and a concentration of perfluorooctanoic acid or perfluorooctanesulfonic acid in the fluorine compound is 5 ng/g or less, and the fluorine compound is attached to the cloth with a quaternary ammonium salt, and the fluorine compound is attached to the cloth with a melamine binder resin, and the fluorine compound consists of:

(a) a fluorine-containing monomer represented by general formula (I):

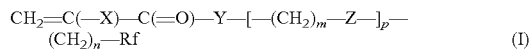

$$CH_2=C(-X)-C(=O)-Y-[-(CH_2)_m-Z-]_p-(CH_2)_n-Rf \quad (I)$$

[in the formula, X is a hydrogen atom, a methyl group, a fluorine atom, a chlorine atom, a bromine atom, an iodine atom, a CFX1X2 group (wherein X1 and X2 are a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group, Y is —O— or —NH—, Z is a direct bond, —S— or —SO$_2$—, Rf is a fluoroalkyl group having 1 to 12 carbon atoms, m is 1 to 10, n is 0 to 10 and p is 0 or 1], and (b) an alkoxy group-containing monomer represented by general formula (II):

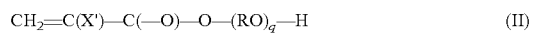

$$CH_2=C(X')-C(=O)-O-(RO)_q-H \quad (II)$$

[in the formula, X' is a hydrogen atom or a methyl group, R is an alkylene group having 2 to 4 carbon atoms in which a part or all of the hydrogen atoms may be substituted with a hydroxyl group, and q is an integer of 1 to 50], as essential components, and the bacteriostatic activity value is 2.2 or more or the bactericidal activity value is 0 or more, in JIS L1902 bacterial suspension absorption method (test bacterium: *Staphylococcus aureus*), and the organic fiber is a false twisted crimped textured yarn, and the cloth is a knitted fabric having densities of 40 courses/2.54 cm or more and 30 wales/2.54 cm or more, or a woven fabric having densities of 40 yarns/2.54 cm or more both for the warp and weft yarns.

2. A textile product comprising the cloth described in claim 1.

* * * * *